United States Patent
Scheidiger et al.

(10) Patent No.: US 11,478,879 B2
(45) Date of Patent: Oct. 25, 2022

(54) MACHINING APPARATUS FOR THE LASER MACHINING OF A WORKPIECE AND METHOD OF THE LASER MACHINING OF A WORKPIECE

(71) Applicant: BYSTRONIC LASER AG, Niederönz (CH)

(72) Inventors: Simon Scheidiger, Langenthal (CH); Andreas Luedi, Burgdorf (CH); Martin Mumenthaler, Rohrbach (CH); Markus Steinlin, Zürich (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/594,992

(22) PCT Filed: Jun. 5, 2020

(86) PCT No.: PCT/EP2020/065615
§ 371 (c)(1),
(2) Date: Nov. 4, 2021

(87) PCT Pub. No.: WO2020/245349
PCT Pub. Date: Dec. 10, 2020

(65) Prior Publication Data
US 2022/0143756 A1    May 12, 2022

(30) Foreign Application Priority Data

Jun. 7, 2019 (DE) .................... 10 2019 115 554.1

(51) Int. Cl.
*B23K 26/38* (2014.01)
*B23K 26/082* (2014.01)

(52) U.S. Cl.
CPC ............ *B23K 26/38* (2013.01); *B23K 26/082* (2015.10)

(58) Field of Classification Search
CPC .................. B23K 26/402; B23K 26/0652; B23K 26/032; B23K 26/046; B23K 26/06; B23K 26/14; B23K 26/40
See application file for complete search history.

(56) References Cited

U.S. PATENT DOCUMENTS

| | | | |
|---|---|---|---|
| 4,275,288 | A | 6/1981 | Makosch et al. |
| 8,781,269 | B2 | 7/2014 | Huber et al. |

(Continued)

FOREIGN PATENT DOCUMENTS

| | | | |
|---|---|---|---|
| DE | 2821883 B1 | 10/1979 | |
| DE | 102009047105 A1 | 5/2011 | |

(Continued)

OTHER PUBLICATIONS

International Search Report and Written Opinion, dated Sep. 18, 2020, from PCT/EP2020/065615 filed Jun. 5, 2020.

(Continued)

*Primary Examiner* — Thien S Tran
(74) *Attorney, Agent, or Firm* — Workman Nydegger (57) ABSTRACT

According to the present application, a machining apparatus (10) for the laser machining of a workpiece (12) in a machining zone (13) is provided, having a first interface (14) for a machining laser source for generating a machining laser beam (15), a second interface (16) for a detector device (for detecting radiation (17) emitted by the machining zone (13); an outlet opening (18) for the machining laser beam (14); and first and second laser beam guiding devices (20, 22), wherein the first laser beam guiding device (20), 20a, 20b) is arranged and designed such that it guides the machining laser beam (14) to the second laser beam guiding device (22) and dynamically moves the machining laser beam (14), and the second laser beam guiding device (22) is arranged and designed such that it guides the dynamically moved machining laser beam (14) through the outlet open- (Continued)

ing (18) and at least partially guides the radiation (17) emitted by the machining zone (13) through the outlet opening to the second interface (16). Further provided is a method for the laser machining of a workpiece (12).

19 Claims, 8 Drawing Sheets

(56) References Cited

U.S. PATENT DOCUMENTS

| | | | |
|---|---|---|---|
| 9,250,390 | B2 | 2/2016 | Muendel et al. |
| 9,346,126 | B2 | 5/2016 | Watanabe et al. |
| 2004/0056009 | A1 | 3/2004 | Gross et al. |
| 2014/0268368 | A1 | 9/2014 | Chan |
| 2015/0009508 | A1 | 1/2015 | Bachmann et al. |
| 2015/0185472 | A1 | 7/2015 | Ziolek et al. |
| 2015/0352666 | A1* | 12/2015 | Fujita .................. B23K 26/402 219/121.61 |
| 2016/0089749 | A1 | 3/2016 | Mori |
| 2017/0371166 | A1 | 12/2017 | Rudolf et al. |
| 2018/0009062 | A1* | 1/2018 | Sbetti ...................... B23K 26/14 |
| 2018/0169788 | A1* | 6/2018 | Sonner ................. B23K 26/032 |

FOREIGN PATENT DOCUMENTS

| | | |
|---|---|---|
| DE | 102008053397 B4 | 12/2012 |
| DE | 102015116033 A1 | 3/2016 |
| DE | 102015101263 A1 | 7/2016 |
| DE | 102017210098 A1 | 12/2018 |
| EP | 2730363 A1 | 5/2014 |
| EP | 2762263 A1 | 8/2014 |
| EP | 2778746 B1 | 9/2014 |

OTHER PUBLICATIONS

International Preliminary Report on Patentability, dated Feb. 5, 2021, from PCT/EP2020/065615 filed Jun. 5, 2020.

* cited by examiner

MACHINING APPARATUS FOR THE LASER MACHINING OF A WORKPIECE AND METHOD OF THE LASER MACHINING OF A WORKPIECE

The present invention relates to a machining apparatus for the laser machining of a workpiece, a use of a machining apparatus for the laser machining of a workpiece and a method for the laser machining of a workpiece.

Laser machining apparatus are used in the laser machining of workpieces, in particular in methods for thermally separating materials by means of laser radiation, such as laser cutting. In many cases, a laser machining head is used to guide the machining laser beam onto the workpiece, for example onto a metal sheet to be machined.

Depending on the workpiece type, e.g. depending on the metal sheet thickness and the material of the workpiece, and/or depending on the machining process, it may be desirable to employ different laser beams. Some commercially available laser machining heads provide an unchangeable optical imaging ratio for the laser beam from the laser source. In practice, however, this type of imaging may be regarded as a compromise, as fixed imaging is associated with losses in cutting quality, specifically roughness and burr adhesion, as well as with lower feed speeds, especially for medium to large metal sheet thicknesses. In recent years, zoom optics for laser machining heads have been developed to adapt the spot size of the focused laser beam to the respective application (e.g. to the metal sheet thickness and the material in the case of laser cutting).

There are also approaches for adapting the laser beam to the machining process, in which the intensity distribution and/or quality, in particular the beam parameter product (BPP) of the laser beam can be adapted to the application:

U.S. Pat. No. 8,781,269 B2 describes a method for changing the beam profile characteristics of a laser beam.

U.S. Pat. No. 9,250,390 B2 relates to a waveguide system for a laser machining system with which the divergence of the laser beam can be adjusted dynamically and at the same time as the spot size.

U.S. Pat. No. 9,346,126 B2 discloses a laser machining head that converges a laser beam emitted by a laser oscillator with a spherical lens.

EP2730363 A1 describes an optical system for a laser machining apparatus, with which the intensity distribution of the laser beam can be changed by means of lenses and an axicon.

EP2762263 A1 relates to a laser cutting apparatus in which an annular laser beam with expanding inner and outer diameters is generated by means of a condenser lens.

According to DE2821883 B1, annular or cup-shaped temperature distributions can be generated by means of an axicon and a downstream lens, causing homogenisation of the temperature in the workpiece.

DE102015116033 A1 describes a laser machining apparatus having an optical transmission element, which possesses a beam diameter enlargement part.

EP2778746 B1 discloses a device with which size parameters of the beam spot in the focal plane can be varied.

DE102015101263 A1 relates to an apparatus for material machining by means of laser radiation having focusing optics and setting optics for setting the intensity distribution with at least two plate-shaped optical members.

DE102008053397 B4 discloses a method for fusion cutting workpieces with laser radiation, in which the angle of inclination of the cutting front is permanently changed by a movement of the focal point of the laser beam superimposed on the feed movement in such a manner that the angle of incidence of the laser beam is kept within an interval around the Brewster angle.

High-frequency beam oscillation is among the technologies of dynamic beam shaping and has the great advantage that different intensity distributions can be generated and that there is a high degree of flexibility in adapting the laser beam to the respective metal sheet thickness/quality. In this manner, better results can also be achieved in laser machining (see Goppold, et al.: Chancen and Herausforderungen der dynamischen Strahlformung, Deutscher Schneidkongress, 2018; Goppold, et al.: Dynamic Beam Shaping Improves Laser Cutting of Thick Steel Plates, Industrial Photonics, 2017; Goppold, et al.: Laserschmelzschneiden mit dynamischer Strahlformung, Fraunhofer IWS Jahresbericht, 2015; Mahrle, et al.: Theoretical aspects of fibre laser cutting, Journal of Physics D Applied Physics, 2009).

Just as important as the laser beam tool is a laser machining apparatus acting as autonomously and self-sufficiently as possible, which can be used in production without any or with an operating staff as small as possible. In such cases, process monitoring with adjustment is often employed, which autonomously detects and can, ideally, correct undesired process behaviour in laser machining. Camera observation of the machining zone of the workpiece coaxial with the machining laser beam, for example with coaxial illumination, constitutes an example of process observation.

It is the object of the invention to provide a machining apparatus and a method for the laser machining of a workpiece, which allow dynamic beam shaping with simultaneous process observation.

This aim is achieved by a machining apparatus for the laser machining of a workpiece according to claim 1, a use of a machining apparatus according to claim 20 and a method for the laser machining of a workpiece according to claim 21.

In one embodiment of the invention, a machining apparatus for the laser machining of a workpiece in a machining zone, in particular for laser cutting, in particular a laser machining head, is provided, having a first interface for a machining laser source for generating a machining laser beam, a second interface for a detector device for detecting radiation emitted by the machining zone; an outlet opening for the machining laser beam; and first and second laser beam guiding devices, wherein the first laser beam guiding device is arranged and designed such that it guides the machining laser beam to the second laser beam guiding device and dynamically moves, in particular dynamically shapes, the machining laser beam, and the second laser beam guiding device is arranged and designed such that it guides the dynamically moved machining laser beam through the outlet opening and at least partially guides the radiation emitted by the machining zone through the outlet opening to the second interface.

Thus, the machining laser beam can be dynamically moved by means of the first laser beam guiding device and guided through the outlet opening by means of the second laser beam guiding device. At the same time, the radiation emitted by the machined workpiece through the outlet opening can be guided from the second laser beam guiding device to the second interface, e.g. for the purpose of process observation. This allows the beam path of the radiation emitted by the machining zone through the outlet opening and guided to the second interface to be arranged separate from and unaffected by the part of the beam path of the machining laser in which the dynamic, in particular beam-shaping, movement of the machining laser beam is generated. In the area between the outlet opening and the second laser beam guiding device, the beam path of the radiation emitted by the machining zone and guided to the second interface can run coaxially with the beam path of the machining laser beam. In addition, a space-saving arrangement of the beam paths of the machining laser and of the radiation emitted by the machining zone through the outlet opening and guided to the second interface is realised. Furthermore, the machining apparatus, even if it is designed as a machining head, can be used for powers of the machining laser of more than 4 kW, since the part of the beam path of the machining laser in which the dynamic and/or beam-changing movement of the machining laser beam is generated is arranged separately. In particular, the machining laser beam can be dynamically moved to be at least perpendicular to its direction of propagation. In this manner, almost any intensity distribution of the beam spot and beam parameter products of the machining laser beam can be provided, while the radiation emitted by the machining zone through the outlet opening and guided to the second interface remains unaffected.

The second interface can be connected to or provided with a detector device for detecting at least part of the radiation emitted by the machining zone through the outlet opening. This allows the beam path of a detector-based process observation of the machining zone to be arranged separately from the beam path of the machining laser such that the process observation is unaffected by the beam-changing effect of the dynamic movement of the machining laser beam.

The first laser beam guiding device and/or the second laser beam guiding device can be designed such that the machining laser beam is deflected. Thus, the machining beam can be deflected at least once within the machining apparatus. When deflection occurs, the beam shaping can be performed. When another deflection of the machining laser beam occurs, the deflection can be combined with the process observation. In this manner, a separate, non-beam-changing area can be created for the radiation emitted by the machining zone through the outlet opening, and the machining laser beam can be changed, e.g. shaped, in a beam-changing area without affecting the imaging of the machining zone for the process observation detector, e.g. a camera. In addition, these embodiments promote a space-saving design of the machining apparatus.

The first laser beam guiding device can have at least one deflection device for the machining laser beam, which is at least partially dynamically movable by means of at least one movement unit. For this purpose, the deflection device can have a dynamically movable surface at least partially reflecting the machining laser beam. These embodiments provide a particularly space-saving configuration of the machining apparatus.

The deflection device can further have at least one dynamically orientable mirror. The machining laser beam can thus be shaped to be highly variable.

In further embodiments, the first laser beam guiding device can have at least one galvanometer scanner. The deflection device can be designed as a galvanometer scanner. This allows different beam supplies to the machining apparatus. In addition, galvanometer scanners are available as finished units and can be readily employed in the machining apparatus. In addition, the galvanometer scanner allows highly flexible, dynamic beam shaping of the machining laser beam, in particular perpendicular to its direction of propagation, and thus the provision of almost any intensity distribution of the laser beam spot and beam parameter products.

In one embodiment, the deflection device can have at least one segmented mirror with a plurality of mirror segments, each of which is dynamically orientable. According to an alternative embodiment, the deflection device can have at least one dynamically deformable mirror. In both designs, the deflection device can provide an overall surface at least partially reflecting the machining laser beam, the surface geometry, in particular the curvature, of which is highly dynamically adjustable. With these embodiments, it is therefore not only possible to effect highly flexible, dynamic beam shaping of the machining laser beam perpendicular to its direction of propagation. It is also possible to realise adjustment of the position of the focus of the laser beam in parallel with its direction of propagation, in particular modification of the focal length of the optical system of the machining apparatus, e.g. a zooming function.

In the above embodiments, the deflection device can have at least one element selected from a mirror deformable with at least one piezo actuator, a deformable bimorphic mirror, a mirror deformable based on MEMS or MOEMS and a mirror deformable based on an oscillating coil.

According to a further embodiment, the deflection device can have at least one mirror which is rotatable about an axis which forms an angle with a reflecting plane of the mirror and which is orientable such that the angle is greater or smaller than 90°. This allows the tilt angle of the mirror to be set and the tilted mirror to be able to rotate about its axis fast, e.g. at a frequency of 100 Hz to 10 kHz. If the angle is set not equal to 90°, the laser beam describes a circular movement. In this manner, the machining laser beam can be guided on a circular path with an adjustable radius on the workpiece at high speed. Thus, for the thermally inert cutting process, the highly dynamically moved machining laser beam can act like what is termed a doughnut beam over a time average.

In another embodiment, the first laser beam guiding device can have at least one optical unit, in particular a refractive optical unit and/or an off-axis parabolic mirror, which is at least partially dynamically movable by means of at least one movement unit, in particular a dynamically movable laser fibre end unit, and optionally at least one first deflection device for the machining laser beam, which is not dynamically movable. As a result, a dynamic movement of the machining laser beam can be realised in the area of the coupling or supply of the machining laser beam into the machining apparatus, which beam can then be guided to the second laser beam guiding device without further dynamically movable guiding elements. In particular, an oscillating pendular beam movement of the machining laser beam can be effected by means of the dynamically movable optical unit.

In the aforementioned embodiments, the movement unit can be at least one element selected from a piezo actuator, an electric motor, a pneumatic motor, a cam, an apparatus for generating an oscillating electromagnetic field, a MEMS oscillator, an oscillating coil, an electrostatically movable actuator, a plurality thereof and/or a combination thereof. This allows highly variable and/or high-frequency dynamic movement of the machining laser beam.

In further embodiments, the first laser beam guiding device can be designed such that the machining laser beam is deflected at an angle smaller than, equal to and/or greater than 90° and at least once. The second laser beam guiding device can be designed such that the machining laser beam is deflected at an angle smaller than, equal to or greater than 90°. The first laser beam guiding device can be designed such that the machining laser beam is deflected at least once at an angle smaller than or greater than 90° and at least once at an angle smaller than 90°. The aforementioned embodiments allow beam supply of the machining laser beam into the machining apparatus, in which the beam path of the machining laser beam between the first interface and the first laser beam guiding device runs parallel or at any angle, in particular perpendicular, to the beam path of the machining laser between the second laser beam guiding device and the outlet opening. The beam path of the machining laser beam between the first and second laser beam guiding devices can run at any angle, in particular perpendicular, to the beam path of the machining laser between the second laser beam guiding device and the outlet opening.

The second laser beam guiding device can have at least one second deflection device for the machining laser beam, which is not dynamically movable. This configuration additionally promotes that the radiation emitted by the machining zone through the outlet opening and guided to the second interface by the second laser beam guiding device is not affected by dynamically movable elements.

In embodiments, the second laser beam guiding arrangement, in particular the second deflection device, can be at least partially transparent to the radiation emitted by the machining zone. The second deflection device can have at least one dichroic mirror or be designed as a dichroic mirror. In this manner, the second deflection device can at least partially guide the radiation emitted by the machining zone to the second interface, while guiding the machining laser beam to the outlet opening. Furthermore, the second laser beam guiding device, in particular the second deflection device, can be arranged and designed such that it guides the dynamically moved machining laser beam at least partially coaxially with the radiation emitted by the machining zone through the outlet opening.

The first laser beam guiding device can be arranged in the area between the first interface and the second laser beam guiding device. Furthermore, the second laser beam guiding device can be arranged in the area between the second interface and the outlet opening.

According to embodiments, at least one optical member can be arranged in the area between the first interface and the outlet opening and/or in the area between the second interface and the outlet opening. A focusing optic or a focusing optical member can be arranged in the area between the second laser beam guiding device and the outlet opening.

In embodiments, the first interface can be connected to or provided with a machining laser source for generating the machining laser beam. Further, the machining apparatus can have a control unit for controlling the machining apparatus, in particular the first laser beam guiding device, in particular the at least one movement unit. The control unit can, for example, be connected to the detector device and the first laser beam guiding unit in a hard-wired or wireless data-conducting manner and can thus be used for process monitoring with adjustment, which autonomously detects and/or can correct undesired process behaviour in the laser machining.

Further, the detector device of embodiments can have an adaptive optical unit. The adaptive optical unit, e.g. adaptive optics or adaptive lens (focus-tunable lens), permits the sharpness level of the detector device to be varied in parallel with the direction of propagation of the machining beam depending on the focus position, the workpiece thickness and the desired process observation level.

In the machining apparatus of embodiments, the machining laser source can provide a laser power of at least 1 kW, preferably at least 4 kW, more preferably between 1 and 30 kW, most preferably between 1 and 25 kW. In contrast to the previously known dynamic beam shaping up to a maximum of 4 kW laser power, the machining apparatus of embodiments, in particular as a laser machining head, is employable for laser powers up to at least 10 kW and beyond. Such high laser powers in dynamic movement, e.g. beam shaping, of the machining laser beam, as well as in connection with the possibility of observing and adjusting the machining process in situ according to embodiments, open up new areas of application in laser machining, especially in laser cutting.

In embodiments, the dynamically movable deflection device or the dynamically movable optical unit of the first laser beam guiding device can be at least partially movable at a frequency between 10 Hz and 15 kHz, preferably between 100 Hz and 10 kHz. This allows highly dynamic movement of the machining laser beam, in particular perpendicular to its direction of propagation. The first laser beam guiding device can further be designed such that it generates a focal point oscillation at at least one oscillation amplitude and at least one oscillation frequency and with a focal point oscillation path that corresponds to a two- or three-dimensional Lissajous figure or a combination of two- or three-dimensional Lissajous figures when the machining laser beam is dynamically moved.

An embodiment of the invention relates to a use of a machining apparatus according to any one of the preceding embodiments for the laser machining of a workpiece, in particular for laser cutting.

A further embodiment of the invention provides a method for the laser machining of a workpiece, in particular for laser cutting, in particular using a machining apparatus according to any one of the preceding embodiments of the machining apparatus. The method possesses the steps of: irradiating a machining zone of a workpiece with a machining laser beam from a machining laser source provided at a first interface of a machining apparatus through an outlet opening of the machining apparatus; and detecting at least a part of a radiation emitted by the machining zone through the outlet opening with a detector device connected to or provided on a second interface of the machining apparatus; wherein the machining laser beam is dynamically moved, in particular dynamically shaped, by means of a first laser beam guiding device of the machining apparatus and guided to a second laser beam guiding device of the machining apparatus; the dynamically moved machining laser beam is guided through the outlet opening by means of the second laser beam guiding device; and the radiation emitted by the machining zone through the outlet opening is at least partially guided to the second interface by means of the second laser beam guiding device.

In doing so, the second laser beam guiding device can guide the dynamically moved machining laser beam at least partially coaxially with the radiation emitted by the machining zone through the outlet opening.

With the method for the laser machining of a workpiece of the above embodiments, the same advantages and functions can be realised as with the embodiments of the machining apparatus for the laser machining of a workpiece, in particular with identical and/or analogous features.

Further features and advantages become apparent from the following description of embodiments, the figures and the dependent claims.

All non-mutually exclusive features of embodiments described here can be combined with one another. The same elements of the embodiments are given the same reference symbols in the following description. Individual or a plurality of elements of one embodiment can be used in the other embodiments without further mention. Embodiments of the invention are now described in more detail using the following examples with reference to figures, without intending any limitation thereby. In the figures:

EXAMPLES

The machining apparatus according to the embodiments of the invention are described below, inter alia, by way of examples with a machining head, without limiting the invention thereto. The machining apparatus and the method according to the embodiments of the invention can also be realised without a machining head.

The radiation emitted by the machining zone of the workpiece through the outlet opening can include radiation resulting from the laser machining of the workpiece and/or reflected illuminating light and will also be referred to below by the term "process light".

Furthermore, where value ranges are described here, the specification of a broad range with narrower alternative or preferred ranges is also considered to disclose ranges that may be formed by any combination of specified lower range limits and specified upper range limits.

The terms "dynamic movement" of the laser beam or "dynamically moved" laser beam and modifications thereof presently mean that the laser beam is moved at high frequencies, for example at frequencies of 10 Hz to 15 kHz. The same applies analogously to "dynamically" movable, orientable, adjustable and/or deformable elements of the machining apparatus.

Figure 1:
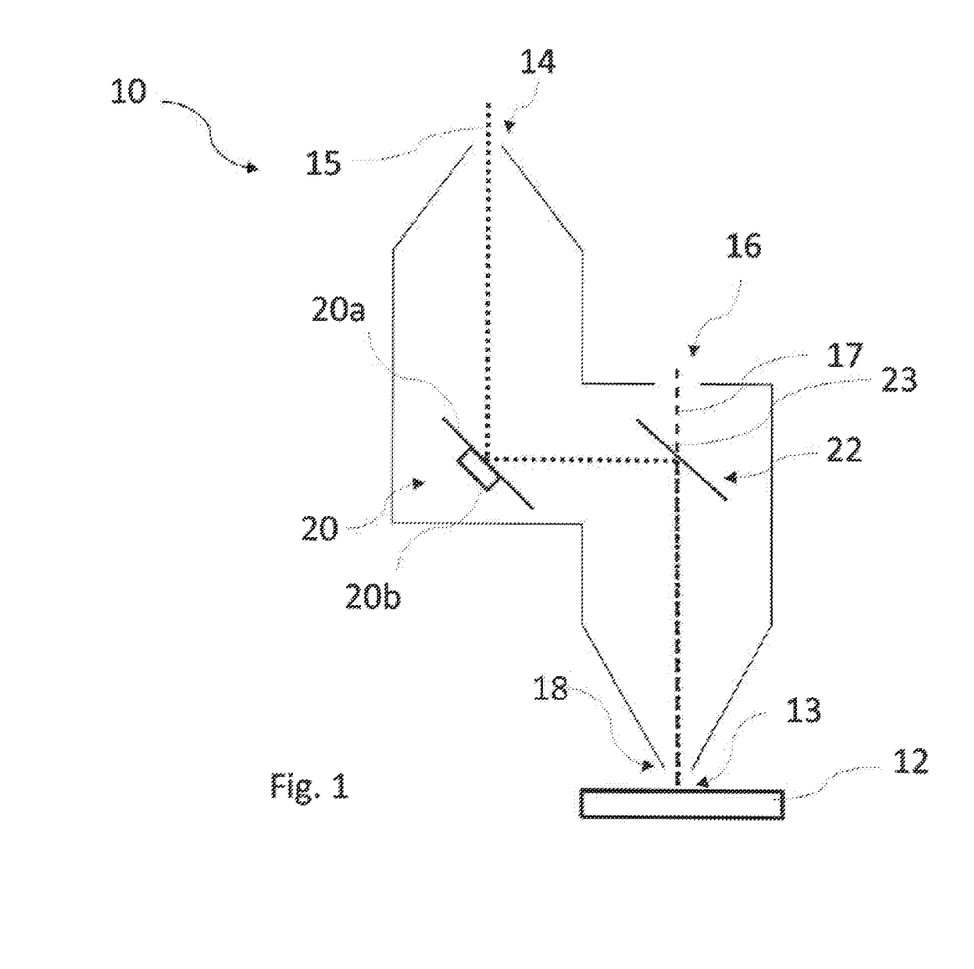
FIG. 1 schematically illustrates a machining apparatus 10 for the laser machining of a workpiece as a first example according to embodiments of the invention.

FIG. 1 schematically illustrates a first example of a machining apparatus 10 according to embodiments of the invention for the laser machining of a workpiece 12 in a machining zone 13.

The machining apparatus 10 has a first interface 14 for a machining laser source for generating a machining laser beam 15 and a second interface 16 for a detector device for detecting process light 17 from the machining zone 13.

The machining laser source and the detector device are not shown in FIG. 1. As illustrated by the example of FIG. 3b, a machining laser source 82 can be provided at the first interface 14 and a detector device 24 can be provided at the second interface 16. The machining laser source 82 provides a machining laser beam 15 with a laser power in the range of, for example, 1 to 30 kW. In the present examples, the machining laser source 82 possesses a power of about 6 kW or more, in particular of 10 kW, and generates the machining laser beam in a spectral range including a wavelength of 1070 nm. Alternatively, direct diode lasers (typically 940 to 980 nm) and further solid-state lasers (typically 1030 to 1080 nm) selected according to the desired application of the machining apparatus and with a correspondingly adapted power, which could be less or more than 6 kW, can be employed. For example, the detector device 24 is a camera sensitive to the process light 17. If, on the other hand, the machining apparatus is designed as a machining head, the first interface 14 can serve to couple in and be connected to the machining laser source 82, e.g. by means of a transport fibre, and the second interface 16 can serve to couple in and be connected to the detector device 24 in a wireless or hard-wired manner.

The machining apparatus 10 possesses an outlet opening 18 for the machining laser beam 15.

A first laser beam guiding device 20 and a second laser beam guiding device 22 are located within the machining apparatus 10.

The first laser beam guiding device 20 is arranged in the area between the first interface 14 and the second laser beam guiding device 22. In the present example, the first laser beam guiding device 20 has a deflection device having at least one surface 20a reflecting the machining laser beam 15. The reflecting surface 20a is oriented such that it deflects the machining beam 15 to the second laser beam guiding device 22 and is at least partially dynamically movable by means of at least one movement unit 20b. For example, the movement unit 20b is selected from a piezo actuator, an electric motor, a pneumatic motor, a cam, an apparatus for generating an oscillating electromagnetic field, a MEMS oscillator, an oscillating coil, an electrostatically movable actuator, a plurality thereof and/or a combination thereof. The first laser beam guiding device 20 is therefore arranged and designed such that it deflects the machining laser beam 15 to the second laser beam guiding device 22 and dynamically moves the machining laser beam 15, for example at a frequency between 10 Hz and 15 kHz.

The second laser beam guiding device 22 is arranged in the area between the first laser beam guiding device 20, the second interface 16 and the outlet opening 18. In the present example, the second laser beam guiding device 22 has a non-movable deflection device 23, which is designed as a dichroic mirror. In the presently described examples, it is, by way of example, a glass mirror (e.g. SiO$_2$, fused silica) or another mirror transparent to visible process light. The dichroic mirror is provided, at least on one side, i.e. on the side facing the laser source, with a dielectric coating. The size of the mirror is chosen such that it corresponds to the diameter of the machining laser beam in the position of the mirror. The dichroic mirror at least partially reflects the machining laser beam 15 and is selectively transparent to at least part of the process light 17. The dichroic mirror is oriented such that the machining laser beam 15 is deflected to the outlet opening 18. In the present example, the second laser beam guiding device 22 is thus designed such that it deflects the dynamically moved machining laser beam 15 and guides it onto the workpiece 12 through the outlet opening 18. At the same time, the second laser beam guiding device 22 has the effect that the process light 17 emitted by the machining zone 13 through the outlet opening 18 at least partially reaches the second interface 16.

During operation of the machining apparatus 10, a machining laser beam 15 is directed from the interface 14 onto the reflecting surface 20a of the first laser beam guiding device 20. The reflecting surface 20a is dynamically moved by the movement unit 20b at a frequency between 10 Hz and 15 kHz. As a result, the machining laser beam 15 is dynamically moved and deflected in the direction of the second laser beam guiding device 22. The machining laser beam 15 there strikes the dichroic mirror of the deflection device 23 and is deflected by the latter in the direction of the outlet opening 18. The dynamically moved and deflected machining laser beam 15 exits through the outlet opening 18 and strikes the workpiece 12. Its machining zone 13 emits process light 17, which partially enters the machining apparatus 10 through the outlet opening 18, penetrates through the dichroic mirror and reaches the second interface 16. In this manner, the dynamically moved machining laser beam 15 is guided coaxially with part of the process light 17 between the second laser beam guiding device 22 and the outlet opening 18. The process light 17 can be detected at the second interface by means of the detector device.

This allows the beam path of the process light 17 guided to the second interface 16 to be arranged separately and unaffected by the part of the beam path of the machining laser beam 15, in which its dynamic movement is generated. For this reason, both functionalities, i.e. dynamic beam shaping and process light detection, can be included in one machining head. The beam path of the process light 17 runs coaxially with the beam path of the machining laser beam 15 in the area between the outlet opening 18 and the second laser beam guiding device 22. Therefore, a space-saving arrangement of the beam paths of the machining laser beam and the process light is realised. In particular, the machining laser beam is dynamically moved to be at least perpendicular to its direction of propagation. In this manner, almost any intensity distribution of the beam spot and thus beam parameter products of the machining laser beam 15 adapted to the workpiece 12 to be machined are provided by means of dynamic beam shaping, while the process light 17 guided to the second interface 16 for the purpose of process observation is essentially decoupled therefrom and remains unaffected.

The beam path of the machining laser beam 15 between the first interface 14 and the first laser beam guiding device 20 is arranged essentially in parallel with the beam path between the second laser beam guiding device 22 and the outlet opening 18, which likewise allows a space-saving arrangement of the beam paths of the machining laser beam and the process light.

FIGS. 2 to 6 show exemplary modifications of the machining apparatus of FIG. 1. Differences from the example of FIG. 1 are therefore explained in the respective descriptions of the figures.

Figure 2:
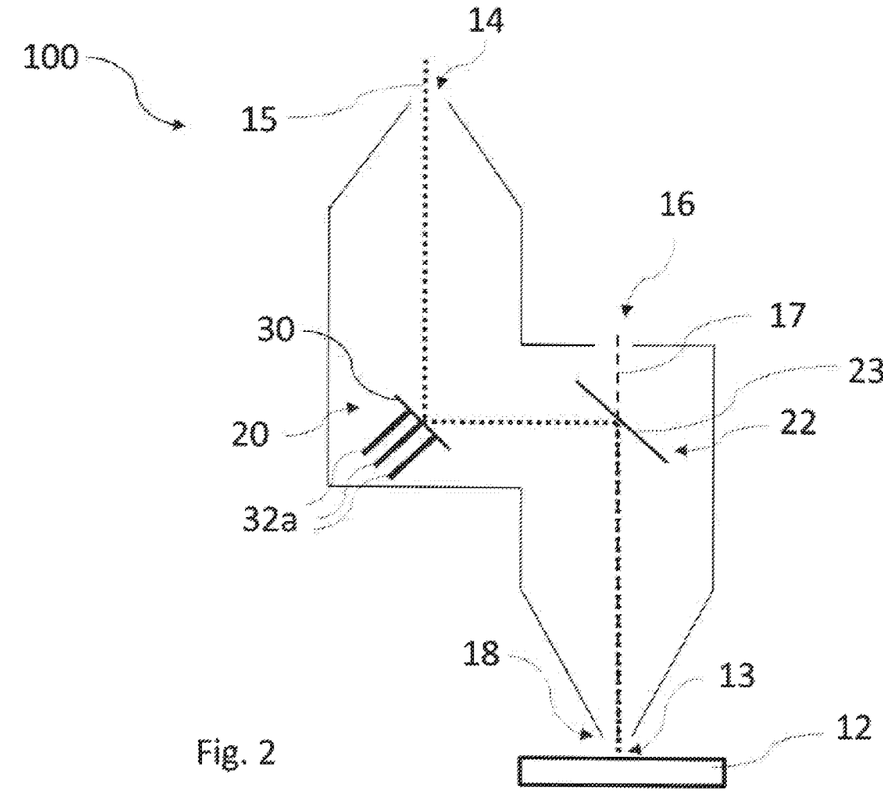
FIG. 2 schematically illustrates a machining apparatus 100 for the laser machining of a workpiece as a second example according to embodiments of the invention.

FIG. 2 schematically illustrates a machining apparatus 100 for the laser machining of the workpiece 12 as a second example according to embodiments of the invention. In this example, the deflection device of the first laser beam guiding device 20 contains a dynamically orientable and planar mirror 30 made of SiC (silicon carbide). Alternatively, a glass substrate (e.g. fused silica) provided with a dielectric layer, a metal layer (e.g. copper) or a metal oxide layer can be employed as a mirror 30. The size of the mirror is chosen such that it corresponds to the diameter of the machining laser beam in the position of the mirror 30. Three piezo actuators 32a by which the mirror 30 is dynamically movable and thus orientable, also called piezo scanners, are provided as a movement unit. The piezo actuators 32a are individually controllable. In the present example, they are piezo actuators based on a modified PZT (lead-zirconate-titanate) ceramic with a typical drive voltage of 120V.

When laser machining, the mirror 30 is tilted by means of the piezo actuators 32a in such a manner that the machining laser beam 15 is deflected to the second laser beam guiding device 22. At the same time, the mirror 30 is dynamically moved by the piezo actuators 32a, providing suitable tilt angles for the deflection, so that the machining laser beam 15 is dynamically moved. In this manner, the beam parameter product of the machining laser beam 15 and the intensity distribution of the laser beam spot on the workpiece 12 can be optimally designed for the respective method for laser machining, since the focal point of the machining laser beam 15 is dynamically moved to be at least perpendicular to its direction of propagation at frequencies between 10 Hz and 15 kHz and thus the laser beam spot is shaped. For example, a focal point oscillation at at least one oscillation amplitude and at least one oscillation frequency and with a focal point oscillation path that corresponds to a two- or three-dimensional Lissajous figure or a combination of two- or three-dimensional Lissajous figures is generated when the machining laser beam 15 is dynamically moved.

Figure 3A:
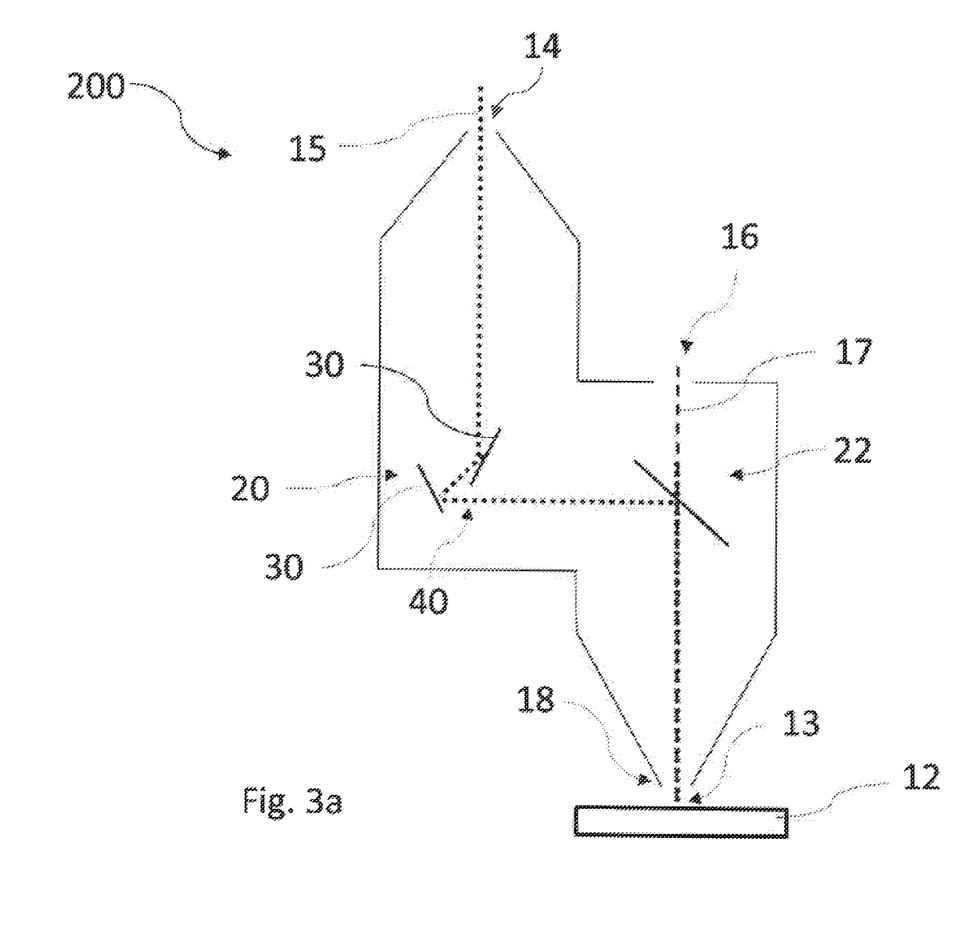
FIG. 3a schematically illustrates a machining apparatus 200 for the laser machining of a workpiece as a third example according to embodiments of the invention.
Figure 3B:
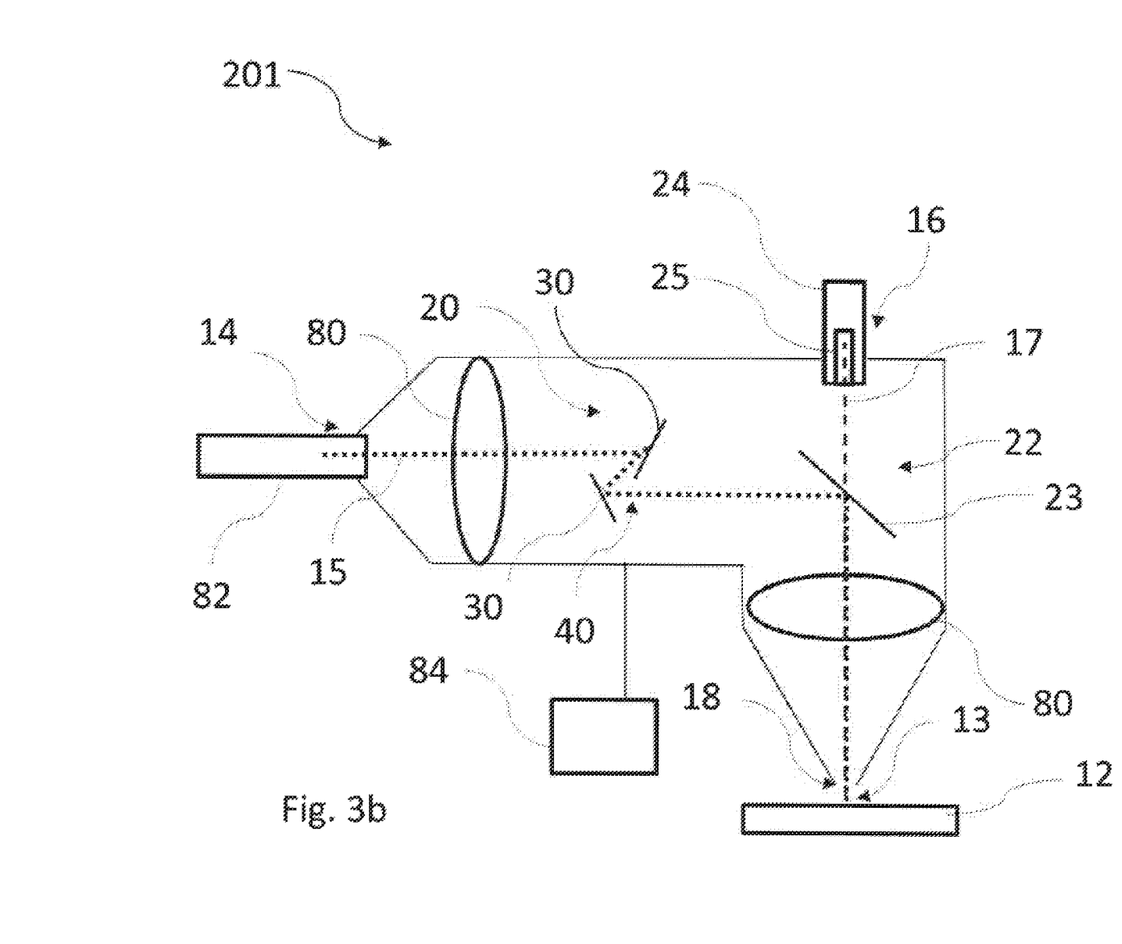
FIG. 3b schematically illustrates a machining apparatus 201 as a modification of the third example.

FIG. 3a schematically illustrates a machining apparatus 200 for the laser machining of the workpiece 12 as a third example according to embodiments of the invention. The laser beam guiding device 20 contains as a deflection device a galvanometer scanner having two mirrors 30, each of which is individually dynamically movable by means of controllable galvanometers (not shown). The galvanometer scanner is provided with two mirrors 30 orientable such that the machining laser beam is deflected at least once at an angle greater than 90° and at least once at an angle smaller than 90°. During operation, the two mirrors 30 are oriented and moved relative to one another such that the machining laser beam 15 is deflected twice and is simultaneously dynamically moved. The machining beam 15 is moved by a mirror 30 in one axis perpendicular to its direction of propagation and by the other mirror 30 in another axis perpendicular to the direction of propagation. For example, the two axes are arranged perpendicular to one another. As a result, almost any intensity distribution of the beam spot and beam parameter products of the machining laser beam 15 are provided by means of dynamic beam shaping, in particular Lissajous figures can be written on the workpiece with the laser beam.

FIG. 3b shows a modification of the third example according to FIG. 3a. In the machining apparatus 201, the first laser beam guiding device 20 is designed such that the machining laser beam 15 runs at an angle, in the present example at a right angle in each case, to the beam path between the second laser beam guiding device 22 and the outlet opening 18 before and after passing through the first laser beam guiding device 20. This means that the machining laser beam 15 is supplied into the machining apparatus 201 laterally. Such a configuration of the beam paths is possible analogously for all other examples in FIGS. 1 to 5.

As illustrated in FIG. 3b, the beam path of the machining laser beam 15 between the first interface 14 and the first laser beam guiding device 20 can run at an angle to the beam path between the second laser beam guiding device 22 and the outlet opening 18. Thus, the beam path of the machining laser beam 15 can be guided at any angle to the beam path between the second laser beam guiding device 22 and the outlet opening 18 before and/or after passing through the first laser beam guiding device 20. This allows a flexible spatial configuration of the machining apparatus. Such a configuration of the beam paths is possible analogously for all other examples in FIGS. 1 to 5.

In detail, in the modification of FIG. 3b, the galvanometer scanner is provided with two mirrors 30 orientable such that the machining laser beam is deflected at least once at an angle smaller than 90° and at least a second time at an angle smaller than 90°. During operation, the two mirrors 30 are oriented and moved towards one another such that the machining laser beam 15 is deflected twice and is at the same time dynamically moved.

FIG. 3b shows elements of the machining apparatus 201, which can also be provided individually or in combination independently of one another in all other embodiments of the machining apparatus, e.g. the machining apparatus 10, 100, 200, 300, 301, 400 and 500 described herein. An optical member 80 can be arranged in the areas between the first interface 14 and the first laser beam guiding device 20 and/or between the second laser beam guiding device 22 and the outlet opening 18. In the example in FIG. 3b, a collimation lens is arranged as an optical member 80 between the first interface 14 and the first laser beam guiding device 20. A focusing lens is provided as an optical member 80 between the deflecting second laser beam guiding device 22 and the outlet opening 18, whereby the thermal focus shift can be kept low even at high laser powers of up to 10 kW and more, by means of mutual compensation in deflection and focusing. Further, a machining laser source 82 is provided at the first interface 14 and a detector device 24 is provided at the second interface 16. In addition, the detector device 24 contains an adaptive optical unit 25. In the present example, the detector device 24 is a camera and the adaptive optical unit 25 is designed as an adaptive lens (focus-tunable lens). The adaptive optical unit 25 permits the sharpness level of the detector device 24 to be varied in parallel with the direction of propagation of the machining beam 15 depending on the focus position, the workpiece thickness and the desired process observation level. Further provided for controlling the machining apparatus is a control unit 84, by which the first laser beam guiding device 20, in particular its at least one movement unit, is controlled.

Figure 4A:
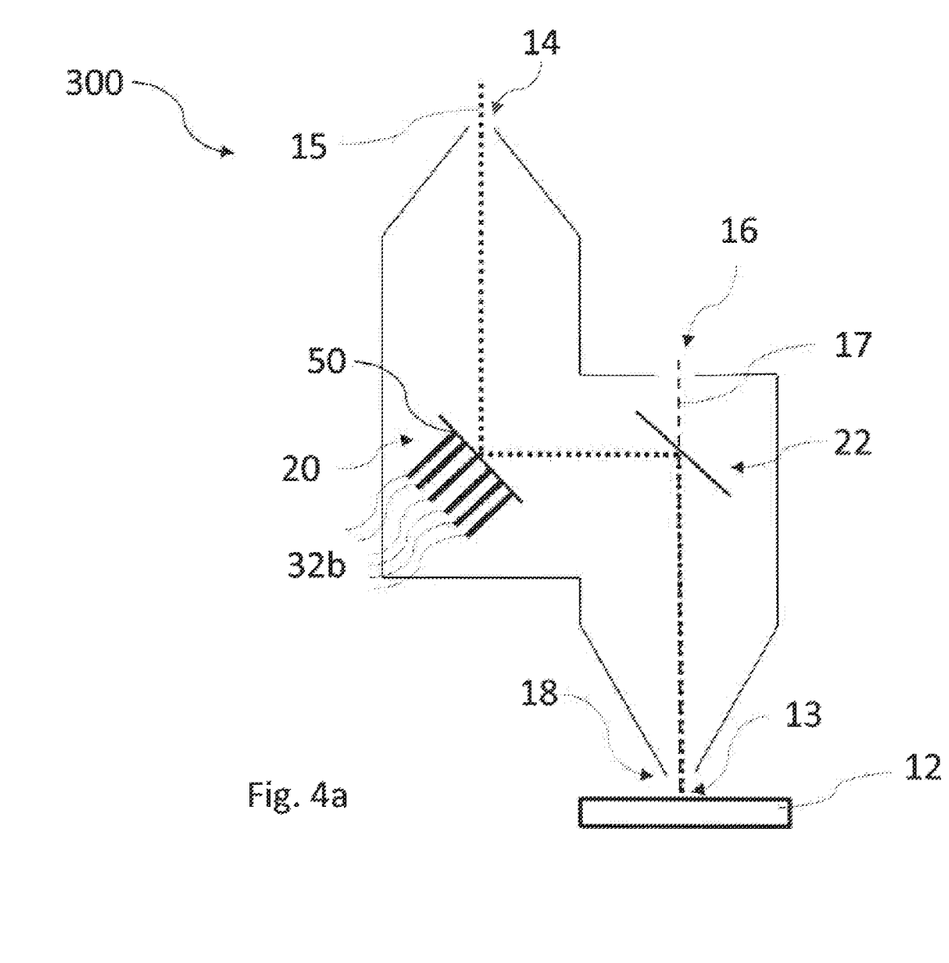
FIG. 4a schematically illustrates a machining apparatus 300 for the laser machining of a workpiece as a fourth example according to embodiments of the invention.

FIG. 4a schematically illustrates a machining apparatus 300 for the laser machining of the workpiece 12 as a fourth example according to embodiments of the invention. The deflection device has an essentially circular mirror segmented mirror 50 having a diameter of approx. 50 mm with 41 mirror segments separated from and arranged next to one another, which form a concentric pattern. Each mirror segment has a gold coating, is reflective for the machining laser beam 15 and can be individually and dynamically oriented as a movement unit by means of a piezo actuator 32b. The piezo actuators 32b at a drive voltage of 120 V are made of a lead-zirconate-titanate (PZT) ceramic and are arranged according to the pattern of the mirror segments. The deflection device thus provides a segmented total surface reflecting the machining laser beam 15, the surface geometry, in particular the curvature, of which can be adjusted in a highly dynamic manner.

Figure 4B:
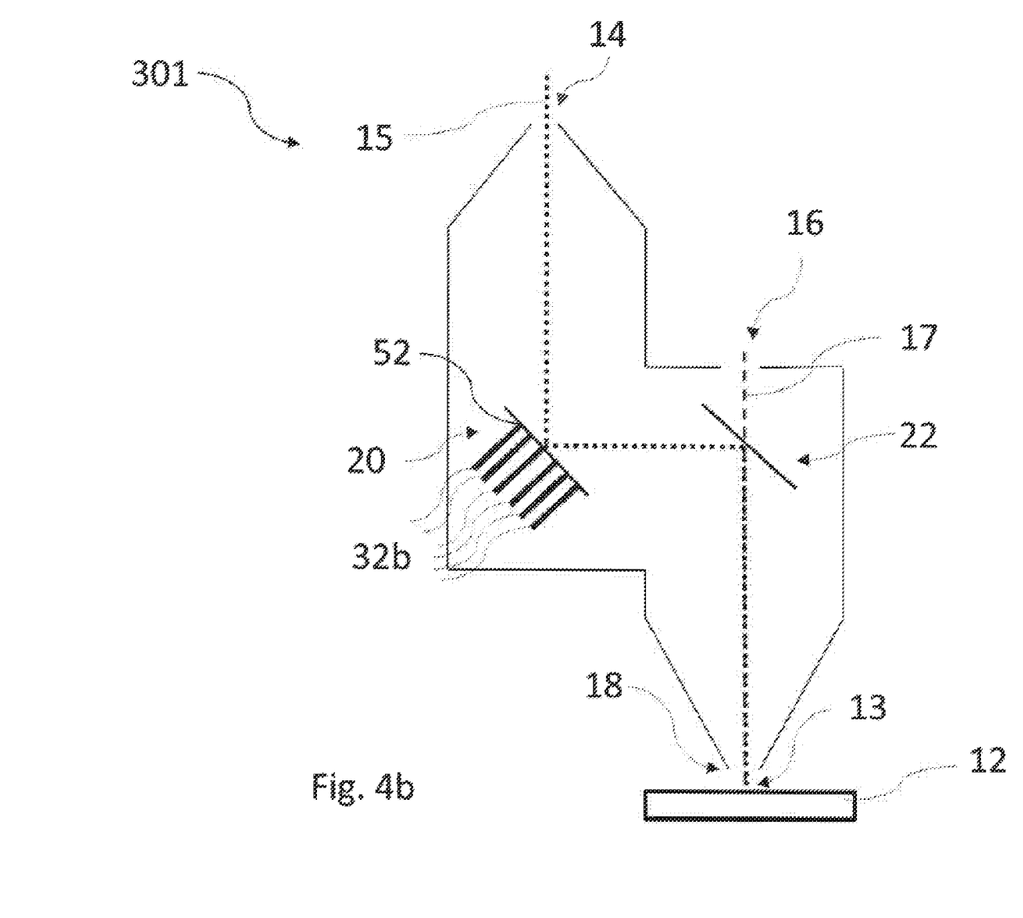
FIG. 4b schematically illustrates a machining apparatus 301 as a modification of the fourth example.

FIG. 4b schematically illustrates a machining apparatus 301 as a modification of the fourth example. The deflection device has a dynamically deformable mirror 52 (DM, dynamic mirror). It is formed by a membrane made of deformable material, which is dynamically deformable by means of individually controllable PZT ceramic piezo actuators (drive voltage: 120 V) 32b evenly distributed on the underside of the membrane. In the present example, the membrane is circular having a diameter of approx. 45 mm. In the present example, 32 piezo actuators are provided, with which 32 individual surface areas of the membrane are individually adjustable. The top of the membrane is provided with a highly reflective, optical coating, i.e. in the present example a copper layer. Alternatively, the coating can be formed from or contain a dielectric material, another metal or a metal oxide. The deformable, reflective and continuous surface thus provided is suitable for laser beams of up to 120 kW at a wavelength of approx. 1070 nm.

Alternatively, a deformable bimorphic mirror, a mirror deformable based on a MEMS (micro-electromechanical system) oscillator or a MOEMS (micro-optical electromechanical system) oscillator or a mirror deformable based on an oscillating coil is provided as a mirror 52. The deformable bimorphic mirror has, for example, a thin glass plate, which is connected to a piezo ceramic plate consisting of two differently polarised piezo layers. At the corners, the plates are kept such that they have resonance properties. The connection between the glass and piezo plates contains an electrically conductive electrode, and the back of the piezo plate is provided with individual control electrodes. During operation, voltages are applied to the control electrodes, generating sideways forces in the piezo plate, thereby bending the mirror. In the case of the mirror deformable based on an MEMS or MOEMS, for example, a continuous, movable electrode, which is flat in its non-deformed state and reflective for the machining laser beam 15 on its surface exposed thereto, is moved via electrostatic forces by means of actuators of a further flat electrode arranged in parallel. In the case of the mirror deformable based on an oscillating coil, oscillating coils are used as actuators, which connect a thick base platform to a relatively thin and deformable glass plate. A reference plate having holes inserted therein is located between the glass plate and the base platform. It is there that the coil actuators are provided. An alternating magnetic field created by current flowing through deflects the coil actuators. They move the glass plate attached thereto.

In the examples of FIGS. 4a and 4b, the deflection device provides an overall surface at least partially reflecting the machining laser beam 15, the surface geometry, in particular the curvature, of which is adjustable in a highly dynamic manner. During an exemplary operation, a highly flexible beam shaping of the machining laser beam 15 is thus carried out at least perpendicular to its direction of propagation. For example, a focal point oscillation can be generated at at least one oscillation amplitude of, e.g., 0.6 mm, and at least one oscillation frequency of, e.g., 500 Hz and with a focal point oscillation path corresponding to a two- or three-dimensional Lissajous figure or a combination two- or three-dimensional Lissajous figures. During the exemplary operation, the position of the focus of the machining laser beam 15 is additionally adjusted in parallel with its direction of propagation, thereby setting or changing the focal length of the optical system of the machining apparatus.

Figure 5:
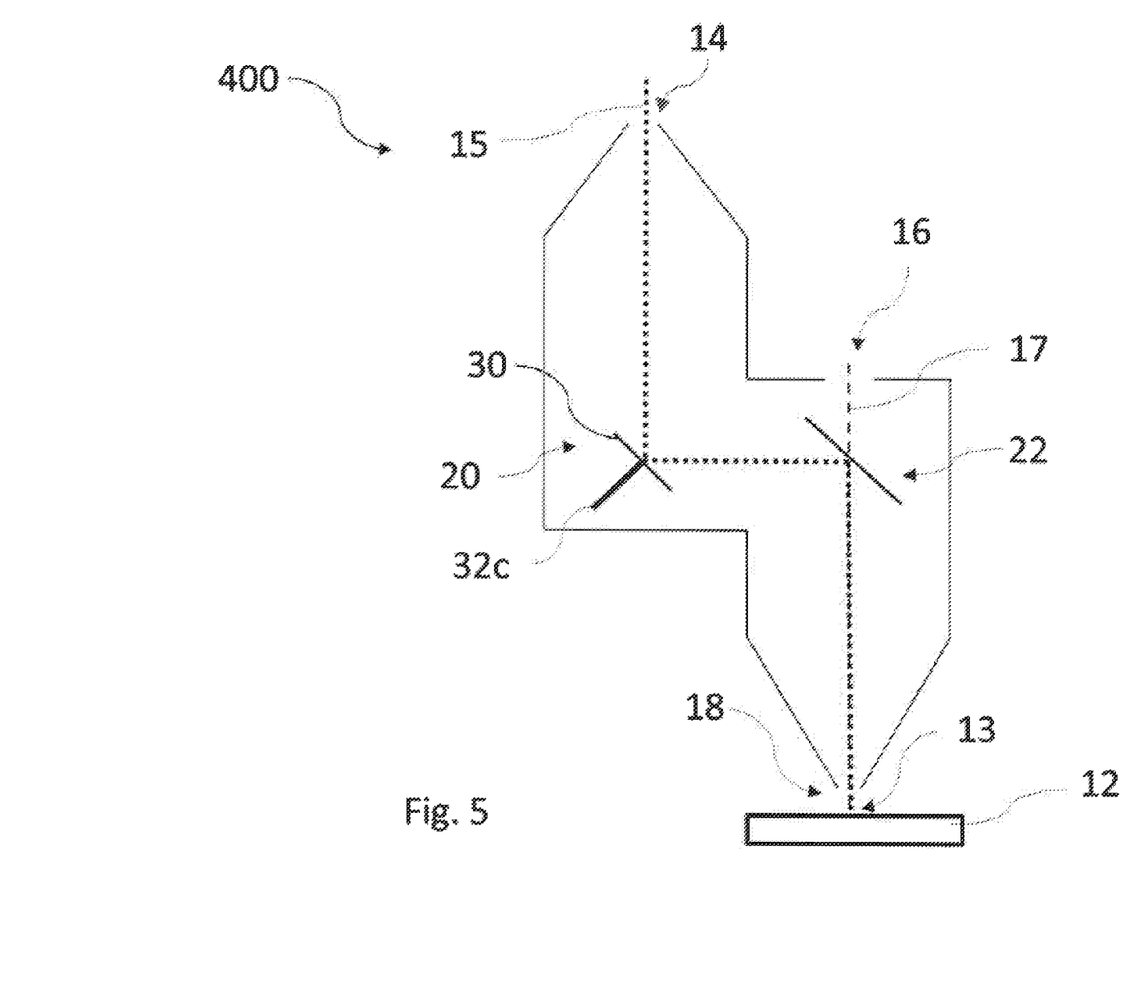
FIG. 5 schematically illustrates a machining apparatus 400 for the laser machining of a workpiece as a fifth example according to embodiments of the invention.

FIG. 5 schematically illustrates a machining apparatus 400 for the laser machining of the workpiece 12 as a fifth example according to embodiments of the invention. The deflection device has a mirror 30 which can be rotated about an axis of a rotary movement device 32c. The mirror is arranged on the axis such that the axis forms an angle with the reflecting surface of the mirror 30. The reflective surface is orientable such that the angle is greater or smaller than 90°. During operation, the angle of the mirror is set not to be equal to 90°, and the mirror thus tilted rotates about its axis at a frequency of 100 Hz to 10 kHz. The laser beam thus forms a circular movement. In this manner, the machining laser beam is guided on a circular path with an adjustable and variable radius on the workpiece 12 at high speed. Thus, for the thermally inert cutting process, the highly dynamically moved machining laser beam 15 can act like what is termed a doughnut beam over a time average.

Figure 6:
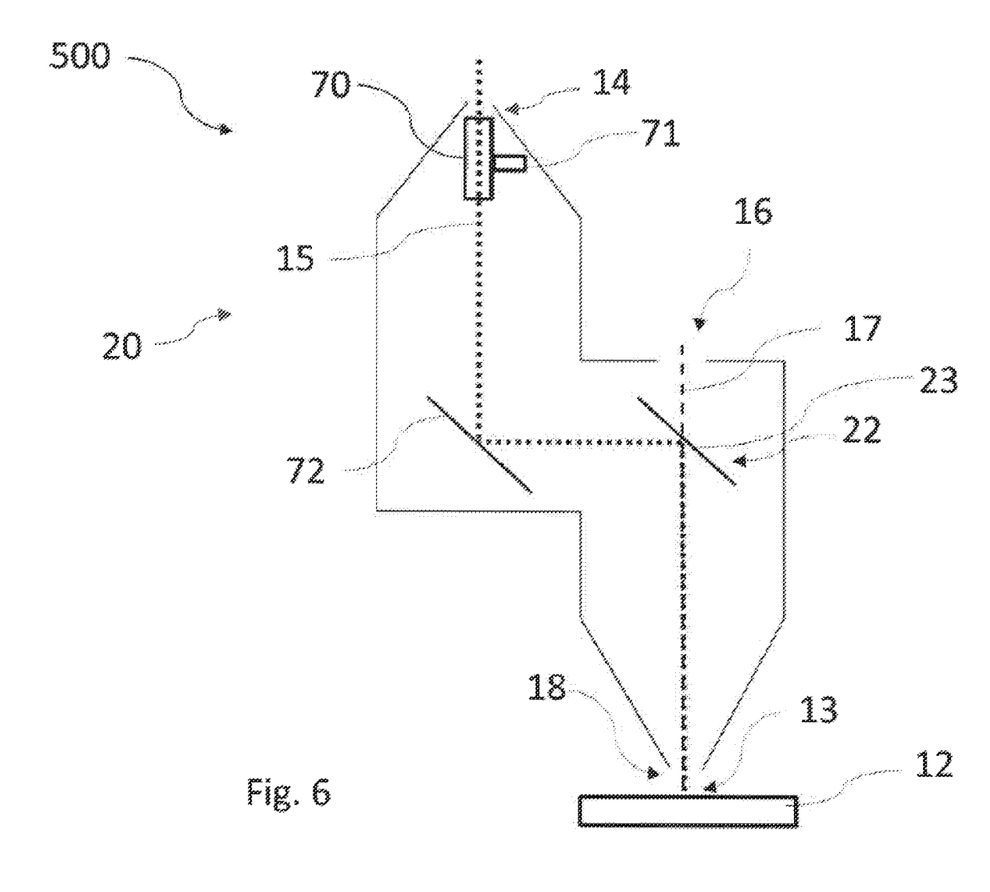
FIG. 6 schematically illustrates a machining apparatus 500 for the laser machining of a workpiece as a sixth example according to embodiments of the invention.

FIG. 6 schematically illustrates a machining apparatus 500 for the laser machining of the workpiece 12 as a sixth example according to embodiments of the invention. The first laser beam guiding device 20 has, as a dynamically movable optical unit 70, a refractive optical unit in the shape of a transport fibre end cap, e.g. made of quartz glass. The end cap is dynamically movable by means of at least one movement unit 71 and thus forms a laser fibre end unit kept dynamically movable. In this example, the movement unit is designed as two PZT ceramic piezo actuators (drive voltage: 120 V) provided in an x/y plane perpendicular to the direction of propagation, i.e. perpendicular to the z direction, of the machining laser beam 15, which are operatively connected to the transport fibre end cap e.g. by means of an adhesive. One piezo actuator serves to deflect the end cap in the x direction, while the other piezo actuator serves to deflect the end cap in the y direction. This allows an oscillating, repetitive movement of the free end of the transport fibre end cap 70 in a plane perpendicular to the direction of propagation (z direction) of the machining laser beam 15. In this manner, oscillation of the focal point of the machining laser beam 15 in a plane perpendicular to its direction of propagation and thereby beam shaping can be induced by adjusting or varying the beam parameter product.

In the example of FIG. 6, the first laser beam guiding device 20 further has a deflection device 72 for the machining laser beam 15, which is not dynamically movable. The beam path of the machining laser beam 15 is arranged before the deflection device substantially in parallel with the beam path between the second laser beam guiding device 22 and the outlet opening 18. This allows a space-saving configuration of the machining apparatus. Alternatively, the beam path of the machining laser beam 15 can be guided before and/or after the deflection device 72 at different angles to the beam path between the second laser beam guiding device 22 and the outlet opening 18. This allows a flexible spatial configuration of the machining apparatus. In a modification of this example, no deflection device 72 is provided. Instead, the machining laser beam 15 can be guided directly from the transport fibre end cap 70 to the second laser beam guiding device 22. In doing so, the beam path of the machining laser beam 15 emitted from the end cap 70 can be guided onto the laser beam guiding device 22 essentially at a 90° angle to the beam path between the second laser beam guiding device 22 and the outlet opening 18. Another angle that allows deflection at the laser beam guiding device 22 can be chosen instead of a 90° angle. Both the example of FIG. 6 and its modification effect sufficient decoupling of the second laser beam guiding device 22 and thereby the beam path of the observed process light 17 from the dynamic movement of the first laser beam guiding device 20.

During operation of the machining apparatus 500, a dynamic movement of the machining laser beam at an oscillation frequency between 10 Hz and 15 kHz, preferably between 100 Hz and 10 kHz, an oscillation amplitude smaller than or equal to +/−5 mm or smaller than or equal to +/−1 mm, and a focal point oscillation path with a path length of greater than or equal to 0.05 mm is generated as soon as in the area of coupling or supplying the machining laser beam 15 into the machining apparatus. The moved machining beam 15 is guided to the second laser beam guiding device 22 and finally through the outlet opening 18 without further dynamically movable guiding elements. An oscillating pendular beam movement of the machining laser beam 15 with which the workpiece 12 is machined, is thus effected by means of the dynamically movable optical unit 70. At the same time, the beam path of the process light 17 guided to the second interface 16 is separate from and unaffected by the part of the beam path of the machining laser beam 15 in which its dynamic movement is generated.

For example, any Lissajous figures can be written on the workpiece 12 with the machining laser beam 15. The Lissajous figures can be stored in a database of the control unit 84 which controls the piezo actuators of the movement unit 71 accordingly. A focal point oscillation at an oscillation amplitude less than or equal to +/−5 mm, an oscillation frequency between 100 Hz and 10 kHz and with a focal point oscillation path of greater than or equal to 0.05 mm corresponding to one two-dimensional Lissajous figure or a combination of two-dimensional Lissajous figures is generated when the machining laser beam 15 is dynamically moved. The focal point has, for example, a diameter or size greater than or equal to 0.1 mm, or greater than or equal to 0.05 mm. For generating a three-dimensional Lissajous figure, the movement unit 71 of FIG. 6 contains an additional piezo actuator, which also deflects the end cap in the z direction.

As a dynamically movable refractive optical unit 70, a free end of an optical fibre or a movable fibre coupling can be provided as an alternative to the transport fibre end cap. Further alternatively, a lens can serve as the dynamically movable refractive optical unit 70, e.g. a focusing lens or a collimation lens. Alternatively, instead of a refractive optical unit, another dynamically movable optical unit 70 can be used, e.g. an off-axis parabolic mirror. In doing so, the lens or the parabolic mirror can be likewise provided in a dynamically movable manner in the propagation direction of the machining laser beam 15 behind the first interface 14 instead of the dynamically movable transport fibre end cap described above, e.g. behind a non-dynamically movable transport fibre end cap present at the interface 14.

The dynamically movable optical unit 70 can be provided at or in the direction of propagation of the machining laser beam 15 behind the first interface 14 or, alternatively, in the area between the first interface 14 and the deflection device 72.

Further, a cam, a device for generating an oscillating electromagnetic field, a MEMS oscillator or a plurality thereof can be employed as a movement unit 71 instead of the piezo actuators.

In all embodiments, advantageous intensity distributions of the beam spot and beam parameter products of the machining laser beam 15 can be provided by means of dynamic beam shaping, while the process light 17 guided to the second interface 16 for the purpose of process observation remains unaffected by the dynamic movement of the machining laser beam 15.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining apparatus for the laser machining of workpieces can be produced so as to be distributed over several physical products.

LIST OF REFERENCE SYMBOLS

10 Machining apparatus
12 Workpiece
13 Machining zone
14 First interface
15 Machining laser beam
16 Second interface
17 Radiation emitted by the machining zone, process light
18 Outlet opening
20 First laser beam guiding device
20a Reflective surface
20b Movement unit
22 Second laser beam guiding device
23 Second deflection device, not dynamically movable
24 Detector device
25 Adaptive optical unit of the detector device
30 Mirrors, dynamically movable
32a, b, c Movement unit
40 Galvanometer scanner
50 Segmented mirror
52 Deformable mirror
70 Optical unit
71 Movement unit
72 First deflection device, not dynamically movable
80 Optical member
82 Machining laser source
84 Control device
100 Machining apparatus
200 Machining apparatus
201 Machining apparatus
300 Machining apparatus
301 Machining apparatus
400 Machining apparatus
500 Machining apparatus

The invention claimed is:

1. A machining apparatus for laser machining of a workpiece in a machining zone, the machining apparatus comprising:
a first interface for a machining laser source for generating a machining laser beam,
a second interface for a detector device for detecting of a radiation emitted by the machining zone;
an outlet opening for the machining laser beam; and
a first and a second laser beam guiding devices,
wherein the first laser beam guiding device is arranged and designed such that it guides the machining laser beam to the second laser beam guiding device and dynamically moves the machining laser beam, and
the second laser beam guiding device is arranged and designed such that it guides the dynamically moved machining laser beam through the outlet opening and at least partially guides the radiation emitted by the machining zone through the outlet opening to the second interface;
wherein the first laser beam guiding device is designed such that the machining laser beam is reflected from the first laser beam guiding device along a beam path to the second laser beam guiding device at least once at an angle smaller than or greater than 90° and at least once at an angle smaller than 90°.

2. The machining apparatus according to claim 1,
wherein the second interface is connected to or provided with a detector device for the detecting of at least part of the radiation emitted by the machining zone through the outlet opening; or
wherein the second laser beam guiding device is designed such that the machining laser beam is deflected.

3. The machining apparatus according to claim 1,
wherein the first laser beam guiding device has at least one deflection device for the machining laser beam, which is at least partially dynamically movable by means of at least one movement unit.

4. The machining apparatus according to claim 3,
wherein the deflection device has at least one dynamically orientable mirror.

5. The machining apparatus according to claim 1,
wherein the first laser beam guiding device has at least one galvanometer scanner and wherein the deflection device is designed as the at least one galvanometer scanner.

6. The machining apparatus according to claim 3,
wherein the deflection device has at least one segmented mirror having a plurality of mirror segments, each of which are dynamically orientable.

7. The machining apparatus according to claim 3,
wherein the deflection device has at least one dynamically deformable mirror.

8. The machining apparatus according to claim 7,
wherein the deflection device has at least one element selected from a mirror deformable with at least one piezo actuator, a deformable bimorphic mirror, a mirror deformable based on an MEMS or MOEMS and a mirror deformable based on an oscillating coil.

9. The machining apparatus according to claim 3,
wherein the deflection device has at least one mirror which is rotatable about an axis which forms an angle with a reflecting plane of the mirror and which is orientable such that the angle is greater or smaller than 90°.

10. The machining apparatus according to claim 1,
wherein the first laser beam guiding device comprises at least one of at least one optical unit and at least one first deflection device, the at least one optical unit being selected from a refractive optical unit or an off-axis parabolic mirror, the at least one optical unit being at least partially dynamically movable by means of at least one movement unit comprising a dynamically movable laser fibre end unit, and the at least one first deflection device is not dynamically movable.

11. The machining apparatus according to claim 3,
wherein the movement unit has at least one element selected from a piezo actuator, an electric motor, a pneumatic motor, a cam, an apparatus for generating an oscillating electromagnetic field, an MEMS oscillator, an oscillating coil, an electrostatically movable actuator, a plurality thereof or a combination thereof.

12. The machining apparatus according to claim 2,
wherein the first laser beam guiding device is designed such that the machining laser beam is reflected at an angle smaller than, equal to or greater than 90°; or
wherein the second laser beam guiding device is designed such that the machining laser beam is deflected at an angle less than, equal to or greater than 90°.

13. The machining apparatus according to claim 2,
wherein the second laser beam guiding device has at least one second deflection device for the machining laser beam, which is not dynamically movable.

14. The machining apparatus according to claim 1,
wherein the second laser beam guiding arrangement is at least partially transparent to the radiation emitted by the machining zone; or
wherein the second laser beam guiding device is arranged and designed such that it guides the dynamically moved machining laser beam at least partially coaxially with the radiation emitted by the machining zone through the outlet opening;
or
wherein the second laser beam guiding arrangement has at least one dichroic mirror or is designed as a dichroic mirror.

15. The machining apparatus according to claim 1,
wherein the first laser beam guiding device is arranged in the area between the first interface and the second laser beam guiding device; or
wherein the second laser beam guiding device is arranged in the area between the second interface and the outlet opening; or
wherein at least one optical member is arranged in the area between the first interface and the outlet opening and/or in the area between the second interface and the outlet opening; or
wherein a focusing optic or a focusing optical member is arranged in the area between the second laser beam guiding device and the outlet opening.

16. The machining apparatus according to claim 1,
wherein the first interface is connected to or provided with a machining laser source for generating the machining laser beam; or
wherein a control unit is provided for controlling the machining apparatus, comprises controlling at least one of the first laser beam guiding device and the at least one movement unit.

17. The machining apparatus according to claim 2,
wherein the detector device has an adaptive optical unit.

18. The machining apparatus according to claim 1,
wherein the machining laser source provides a laser power of at least 1 kW; or
wherein the dynamically movable deflection device or the dynamically movable optical unit of the first laser beam guiding device is at least partially movable at a frequency between 10 Hz and 15 kHz; or
wherein the first laser beam guiding device is designed such that it generates a focal point oscillation at at least one oscillation amplitude and at least one oscillation frequency and with a focal point oscillation path that corresponds to a two- or three-dimensional Lissajous figure or a combination of two- or three-dimensional Lissajous figures when the machining laser beam is dynamically moved.

19. A use of a machining apparatus according to claim 1 for the laser cutting.

* * * * *